Feb. 19, 1929.  1,702,713
F. M. WATKINS
UNLOADING DEVICE FOR CENTRIFUGAL EXTRACTORS
Filed Jan. 5, 1922  3 Sheets-Sheet 3
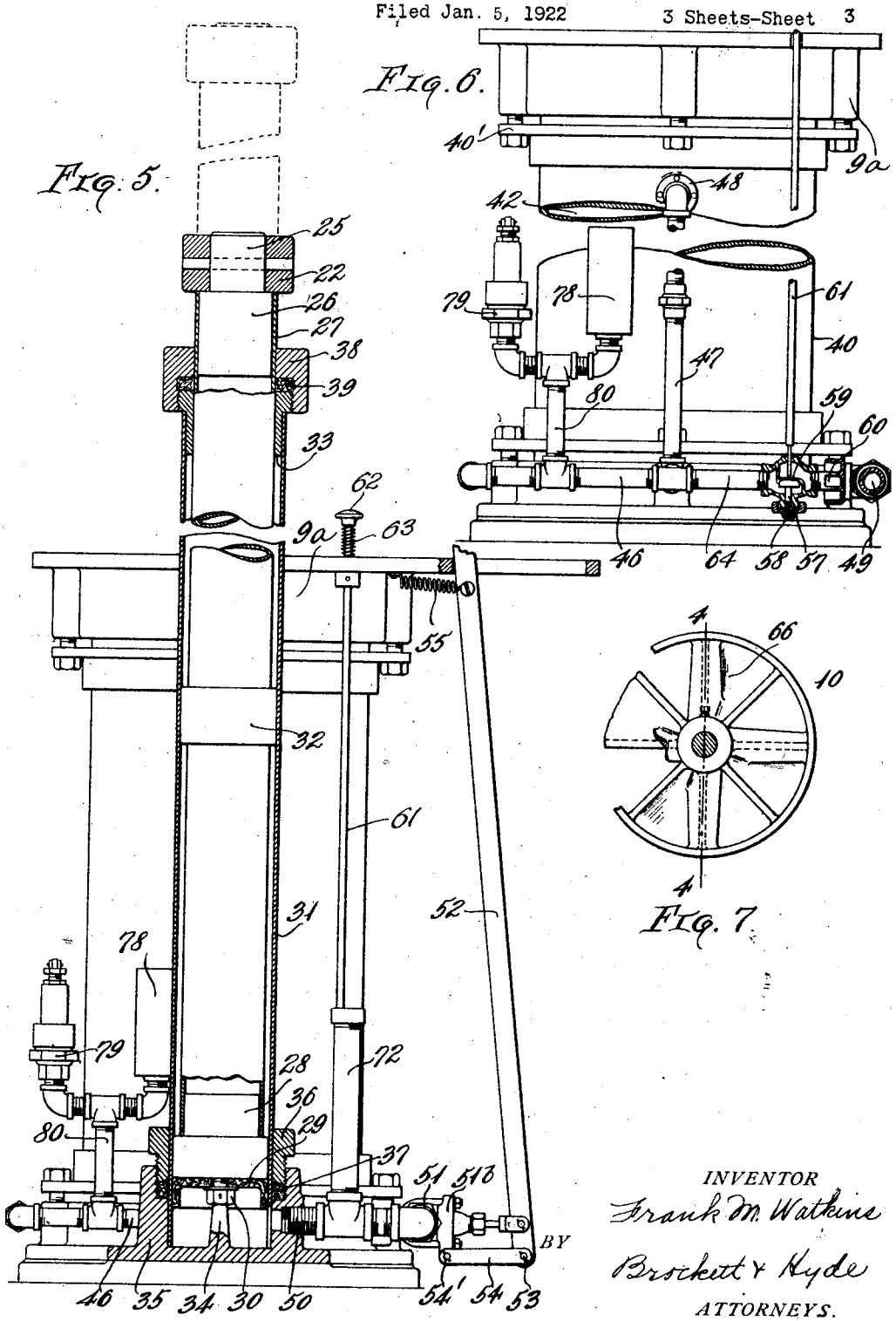
INVENTOR
Frank M. Watkins
BY Brockett & Hyde
ATTORNEYS.

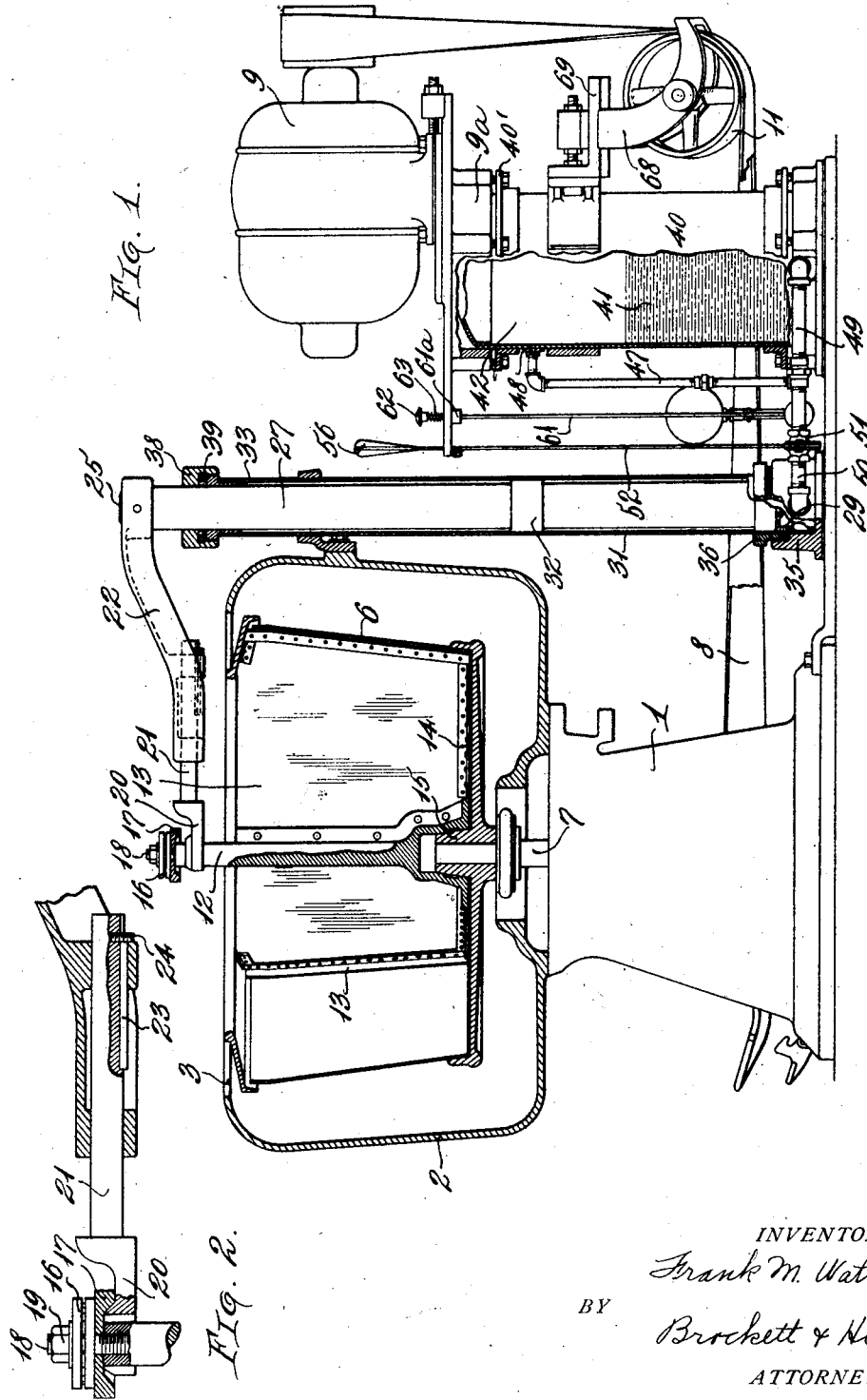

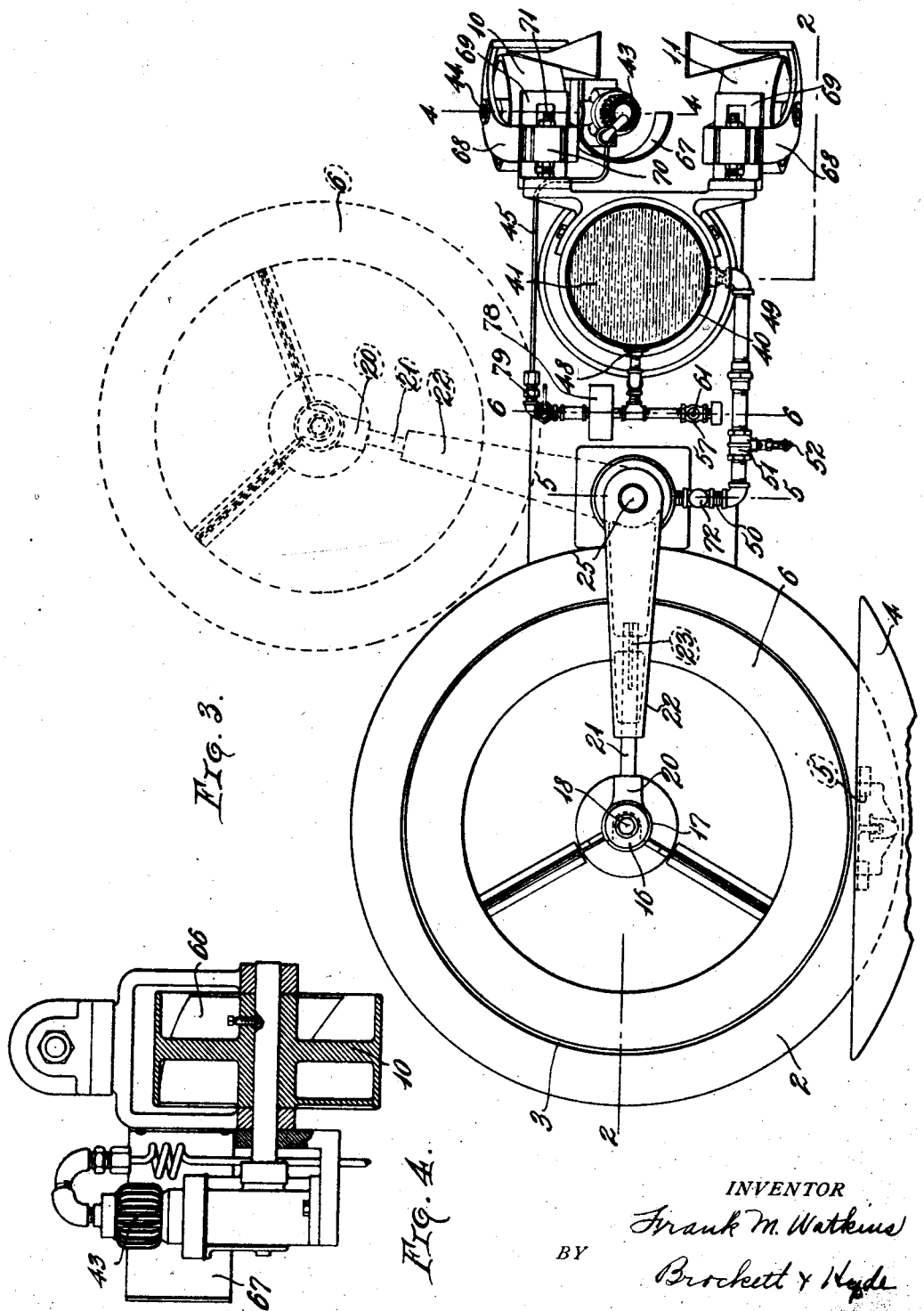

Patented Feb. 19, 1929.

1,702,713

UNITED STATES PATENT OFFICE.

FRANK M. WATKINS, OF CINCINNATI, OHIO.

UNLOADING DEVICE FOR CENTRIFUGAL EXTRACTORS.

Application filed January 5, 1922. Serial No. 527,182.

This invention relates to improvements in centrifugal extractors of the type used in laundries and in which the load-carrying container is adapted to be raised out of the curb to an elevated position for loading and unloading.

The objects of this invention are to provide a liquid-actuated means for raising the load-carrying cage out of the basket to an elevation above the curb so that it can be swung around to a position for unloading and reloading; to provide a rotatable plunger for raising the cage to an elevated position and for permitting the same to be swung around to unloading position; to provide means for storing gaseous pressure upon the liquid so that upon application of the liquid to the plunger, the cage will be raised; to provide means controlled by the cage rotating means for storing the gaseous pressure upon the liquid; to provide improved connections for the application and release of pressure for raising and lowering the cage; to provide an extensible arm upon the plunger with means for releasably connecting the arm to the cage, so that operative connection can be established for raising the cage and the arm released and swung out of the way to permit the closing of the cover; and to provide an air pump for storing pressure upon the liquid, with means for circulating a current of air about the same.

Other objects of this invention will be apparent from the following description and claims when considered together with the accompanying drawings.

Fig. 1 is a side view partly in elevation and partly in section; Fig. 2 is a detail sectional view taken on the line 2—2, Fig. 3; Fig. 3 is a plan view showing a part in section; Fig. 4 is a section taken on line 4—4, Figs. 3 and 7; Fig. 5 is a vertical section taken on line 5—5, Fig. 3; Fig. 6 is a vertical section taken on line 6—6, Fig. 3; and Fig. 7 is an elevation of the pulley upon which are provided the vanes for circulating a current of air.

The main casing 1 of the machine supports the curb 2 which has an opening 3 in its top, this opening being closed by the cover 4 hinged at 5 to the curb. The basket 6 is suitably mounted upon the spindle 7 which is driven by the belt 8 in a well known manner, this belt in turn being driven by the electric motor 9. The belt passes about the idle pulleys 10 and 11. Extending radially from and suitably secured to the stem 12 are the load-dividing partitions 13 which together with the auxiliary bottom 14 constitute what is known as the load-carrying cage adapted to rest within the basket for rotation therewith and which, upon being lowered into the basket, is centered by means of the centering plug 15 formed upon the bottom of the basket. Upon the upper end of the stem 12 I have provided the ball bearing 16 which rests upon the lower collar 17, these parts being secured in position by means of the stud 18 and nut 19. The collar 17 is capable of movement independent of the cage and is adapted to be engaged on its undersurface by the forked end 20 of the arm member 21 which has slidable engagement with the other arm member 22 by means of the key 23. The stop screw 24 is carried by the arm member 21 and is adapted to engage the member 22. These two members 21 and 22 constitute an arm for raising the load-carrying cage out of the basket and when the cage occupies position within the basket, the arm member 21 can be withdrawn so as to permit the arm to be swung out of the way and the cover 4 lowered to close the opening 3 during rotation of the basket.

The rear end of the arm 22 is fixedly secured to the upper reduced end portion 25 of the plug 26 which is suitably secured within the upper end of the hollow plunger 27. The lower end of the hollow plunger 27 is closed by means of a plug 28 which carries on its under face the packing 29 secured thereto by means of the screw bolt 30. This plunger 27 is adapted to be raised and lowered within the cylindrical chamber 31 by means of liquid pressure in a manner to be later described. The upward movement of the plunger is limited by engagement of the collar 32 against the stop 33, while the downward movement of the plunger is limited by engagement of the bolt head 30 with the upwardly extending stop 34 formed integrally with the base casting 35 which receives the lower end of the cylindrical chamber 31. Both the lower and upper ends of the chamber 31 are sealed by means of the gland 36 and packing 37 at the lower end and by means of the gland 38 and packing 39 at the upper end.

The means for supplying fluid pressure to the under side of the plunger for raising the same, comprises a tank 40 containing liquid, as for instance water or oil 41, in its lower portion and adapted to store compressed air in the upper space indicated at 42. The angular ring 40′ has bolted thereto the motor support 9ª. The motor 9, which rotates the basket, operates also an air pump 43 which has driving connection with the shaft 44 of the idle pulley 10 driven by the belt 8. Operation of the pump 43 causes air to be forced through the pipe 45, pipe 46 and upwardly through the connecting pipe 47 into the upper portion of the tank 40 through the air inlet opening 48. Thus, during rotation of the basket, pressure is being stored in the upper portion of the tank 40. The liquid 41 is adapted to be discharged through the pipe 49 connected to the lower end thereof, then through the inlet pipe 50 to the under side of the plunger. This passage is controlled by means of the valve 51 actuated by means of the lever 52 connected to the stem of valve 51 and pivoted at 53 to the link 54, which is pivoted at 54′ to a fixed yoke plate 51ᵇ. The lever 52 is normally under the tension of the spring 55 secured to lever 52 and the support 9ª; so that the valve 51 is normally closed. The handle 56 for control of the lever 52 occupies a position so as to be readily accessible to the operator, as indicated in Fig. 1.

Thus it will be seen that when the motor has been stopped and the basket is still, the arm will be engaged with the stem of the cage; and then upon opening valve 51 the liquid 41 under pressure will be admitted to the under side of the plunger so as to raise the cage. When the cage has been raised to the desired elevation, as determined by the stop, the handle 56 will be released by the operator and the valve 51 closed under tension of the spring 55. The cage is then swung around to unloading position. When the cage has been unloaded and re-loaded and it is desired to lower the same into the basket, it is swung back to position above the basket. Then the operator releases the air pressure in the upper part of the tank preparatory to returning the liquid from the under side of the plunger to the tank. This is accomplished by means of a valve 57 which by virtue of the spring 58 normally closes the passage 59 leading to the discharge outlet 60 for the escape of the air. This valve however, can be opened by depression of the rod 61 which is provided at its upper end with the operating knob 62 operable against the tension of spring 63. The collar 61ª on rod 61 limits its upward movement. This valve 57 controls discharge from the pipe 64 which is connected to the pipe 46; so that, with the valve 51 closed and the plunger in raised position, by opening the valve 57 the air pressure in the upper part of the tank 40 will be released through the pipe 47, pipe 64 and valve opening 59 to the discharge outlet 60. Then upon opening the valve 51 the liquid under the plunger will return by gravity to the tank through the same pipe connections by which it was supplied. The plunger returning by gravity to its lower position will force the liquid back into the tank. Then, knob 62 having been released by the operator, spring 63 causes rod 61 to rise and valve 57 is closed; so that, upon again starting the motor 9 for rotating the basket, the air pump will again store compressed air in the upper part of the tank 40 in the manner above described.

As a means of circulating a current of air about the air pump, I have provided the vanes 66 inside of the pulley 10 and have provided also the deflecting plate 67 around the air pump.

I have provided also a means for adjusting the pulleys 10 and 11 as may be required according to the taut or slack condition of the belt. This means comprises brackets 68 which are adapted for adjustment along the brackets 69 by means of the adjusting blocks 70 and the adjusting screws 71. Brackets 69 are supported upon the wall of the tank 40.

I have provided also an air pocket 72 having communication with the pipe 50 for the purpose of preventing what is known as "water hammer". The cage 78 and the safety valve 79 have operative connection through the pipe 80 with the air supply pipe 46 so as to register the pressure and also to prevent excessive pressure beyond a pre-determined point.

Having described my invention, I claim:

1. A centrifugal extractor, comprising a curb, a load-carrying member rotatably and vertically movable therein, means for rotating said member, fluid pressure means for raising said member, and means operated by said member rotating means when the same rotates and arranged to supply fluid pressure for actuation of said pressure operating means 2. In a centrifugal extractor, the combination of a curb, a rotary load-carrying cage adapted for raising and lowering movement out of and into said curb, means for rotating said cage, means including a fluid supply connection for raising said cage, and means controlled by operation of said rotating means for applying pressure to the fluid supply for raising said cage.

3. In a centrifugal extractor, the combination of a curb, a rotary load-carrying cage adapted for raising and lowering movement out of and into said curb, a plunger for raising said cage, means for rotating said cage, and means controlled by said rotating means for storing energy for the actuation of said plunger.

4. In a centrifugal extractor, the combination of a curb, a rotary load-carrying cage adapted for raising and lowering movement out of and into said curb, means for rotating said cage, a rotatable plunger upon which said cage is supported for raising and lowering the same and permitting swinging movement of the same to unloading position, and means controlled by said rotating means for storing energy for the actuation of said plunger.

5. In a centrifugal extractor, the combination of a curb, a rotary load-carrying cage adapted for raising and lowering movement out of and into said curb, a liquid actuated plunger for raising said cage, means for rotating said cage, and means controlled by said rotating means for storing pressure upon the liquid for operation of said plunger.

6. In a centrifugal extractor, the combination of a curb, a rotary load-carrying cage adapted for raising and lowering movement out of and into said curb, a plunger for raising said cage, means for rotating said cage, and means operated by said rotating means for storing energy for the actuation of said plunger.

7. In a centrifugal extractor, the combination of a curb, a rotary load-carrying cage adapted for raising and lowering movement out of and into said curb, a rotatable arm for raising said cage and adapted to be swung laterally, said arm comprising a plurality of adjustably connected parts, one of said parts having releasable connection with said cage, and means for raising said arm.

8. In a centrifugal extractor, the combination of a curb, a rotary load-carrying cage adapted for raising and lowering movement into and out of said curb, a rotatable plunger for raising said cage, an arm carried by said plunger and having releasable connection with said cage, whereby said cage can be raised by said plunger and said arm can be swung around to one side, and a cover for closing said cage.

9. In a centrifugal extractor, the combination of a curb, a rotary load-carrying cage adapted for raising and lowering movement into and out of said curb, means including an air pump for raising said cage, means including a pulley for rotating said cage and operating said air pump, and means carried by said pulley for circulating air about said air pump.

In testimony whereof I hereby affix my signature.

FRANK M. WATKINS.